W. HUBER.
AUTOMOBILE TOWING DEVICE.
APPLICATION FILED APR. 12, 1918.

1,273,064.

Patented July 16, 1918.
2 SHEETS—SHEET 1.

Inventor:
Werner Huber,
By Henry Orth Jr.
Atty.

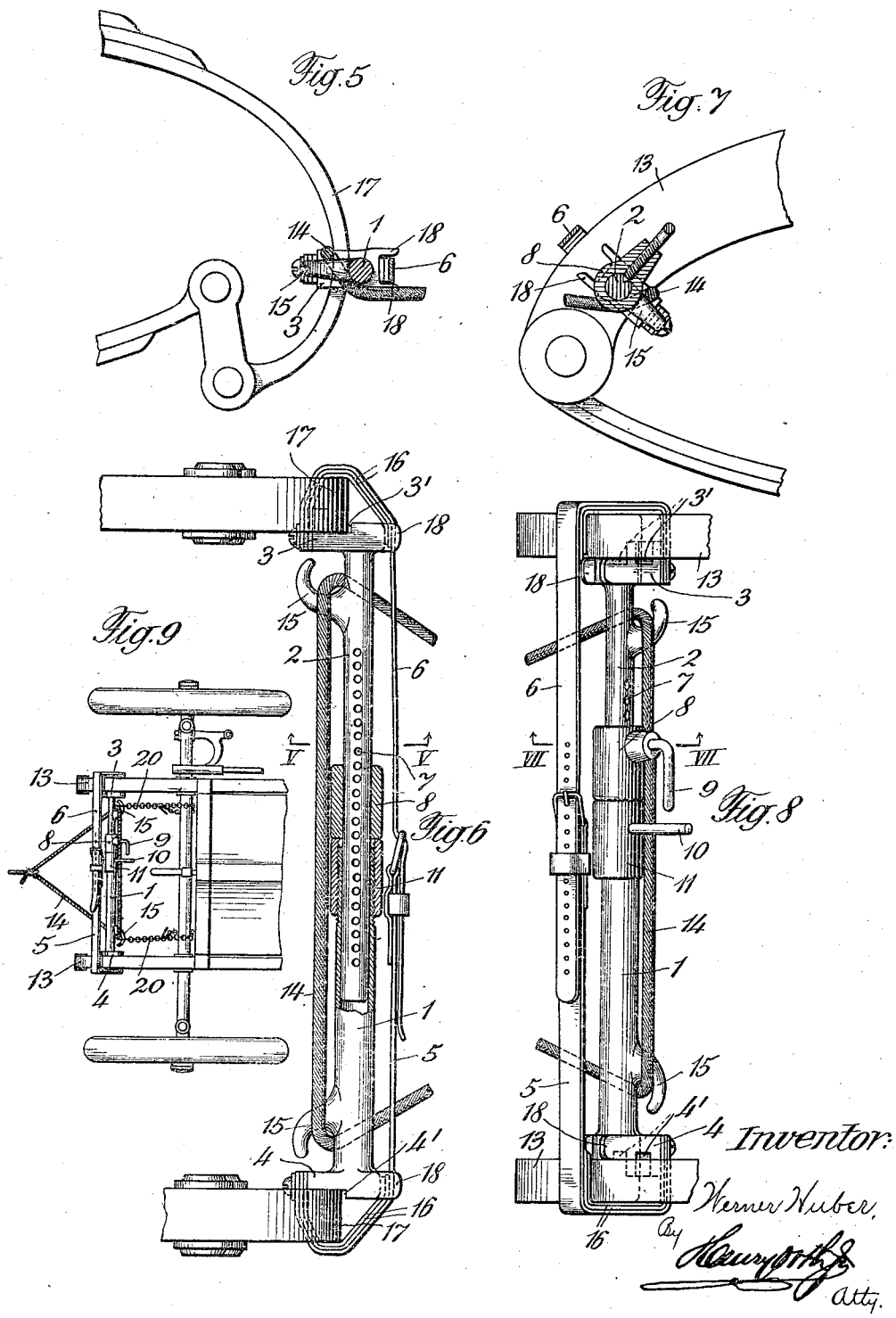

UNITED STATES PATENT OFFICE.

WERNER HUBER, OF ZURICH, SWITZERLAND.

AUTOMOBILE-TOWING DEVICE.

1,273,064.  Specification of Letters Patent.  Patented July 16, 1918.

Application filed April 12, 1918. Serial No. 228,190.

*To all whom it may concern:*

Be it known that I, WERNER HUBER, a citizen of the Republic of Switzerland, residing at Zurich, Dufourstrasse 47, Switzerland, have invented certain new and useful Improvements in Automobile-Towing Devices; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to improvements in automobile towing devices.

Automobile towing attachments for connecting the towed to the towing machines are already known. The attachments of this kind hitherto known are adapted to be connected to the front axle of the towed machine, so that the latter may be towed and steered without requiring an operator for this car. These known towing attachments are, however, of a very complicated design and their fixing to and detaching from the automobiles takes up much time. The latter represents a very great disadvantage as the trailing away of an automobile which has broken down should be effected very quickly, since such cars cause generally a great obstruction of traffic.

For the purpose of connecting the car to be towed to the trouble or towing car, a drawing member, preferably a rope, is preferably twisted around the usual springs or spring carrier arms of one or both automobiles. This manner of connecting the two automobiles is the cheapest and simplest one. It has, however, the drawback, that the lateral tensile stresses exerted thereby upon one or both automobiles may easily cause a deformation of the parts of the automobiles to which the rope is fixed. This drawback due to the action of a lateral tensile stress occurs also in the case, and particularly when driving along a curve, in which the drawing member is passed around only one spring carrier arm or supporting spring, as a lateral tensile stress will then be transmitted to said part of the underframe.

An object of the present invention is to provide an automobile towing device which, when applied to an automobile, eliminates the drawback referred to. The device according to the present invention is adapted to mutually support the supporting springs of automobiles when the latter are towed along and it comprises a strut consisting of two telescopic members and means for detachably connecting said strut between the supporting springs of an automobile. Said strut has ledges adapted to engage parts of the underframe of the automobile and means for effecting a primary and a final exact adjustment of said ledges engaging for instance the supporting springs or spring carrier arms and adapted to keep the strut in the required position.

This invention will now be more particularly described with reference to the accompanying drawings illustrating by way of example two constructions according to the invention.

In these drawings:

Fig. 2 is an enlarged front elevation and partial longitudinal section through the towing device, while

Fig. 5 shows a second construction in section on the line V—V of Fig. 6, fragmentally illustrating portions of the towing car.

Fig. 6 is a corresponding plan view.

Fig. 7 is a section on the line VII—VII of Fig. 8 through the same construction showing the device applied to a towed car and Fig. 8 is a plan view corresponding to Fig. 7.

Fig. 9 illustrates an embodiment of the invention in which a strut of the towing devices is kept in its proper place by means of chains connected to an axle of the automobile.

Figure 1:
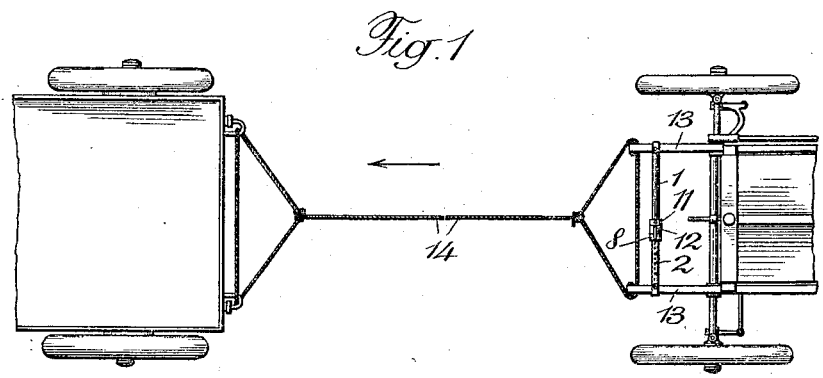
Figure 1 is a plan view of a first embodiment, showing the device applied to the towed car and fragmentally illustrating portions of the latter and of the towing car.
Figure 2:
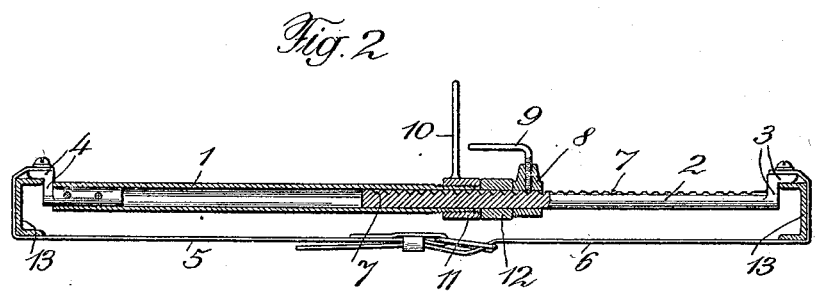
Figure 3:
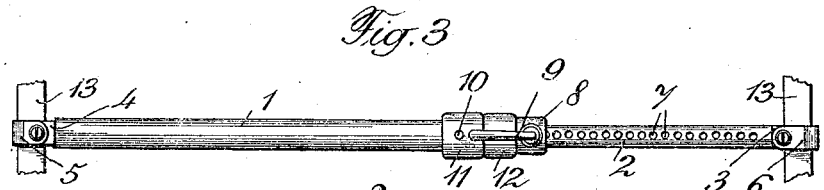
Fig. 3 is a corresponding plan view.

The device illustrated in Figs. 1-3 comprises a strut consisting of two members 1, 2 adapted to be moved telescopically into each other. The member 1 consists of a tube and the member 2 of a solid rod. The outer end of the tube 1 is provided with an angle-shaped ledge 4 and the outer end of the rod 2 with an angle-shaped ledge 3. The rod 2 has notches 7. 8 denotes a ring adjustably mounted on the rod 2. The ring 8 may be fixed to the rod 2 by means of a screw 9 passing through said ring and engaging with one of the notches 7. The inner end of the tube 1 is provided with an external screw-thread with which engages a nut 11 provided with a handle 10. 12 denotes a ring arranged between the adjustable ring 8 and the nut 11 and loose on the rod 2.

When it is desired to apply the device hereinbefore described to an automobile, the members 1, 2 are at first adjusted relatively to each other, the distance between the ledges 3, 4 being made such that the device can be placed between the portions 13 of the underframe of an automobile. To said underframe are fixed the spring supporting arms and it is supported by the front wheel shaft springs of the automobile. Hereupon, the members 1 and 2 are so adjusted by means of the nut 11 that the ledges 3, 4 are caused to engage in a proper manner said portions 13 of the underframe. When this is the case, the device is secured to the portions 13 of the underframe by means of a belt 5, 6 fixed to the ledges 3, 4 (Fig. 2). To the portions 13 may then be attached in any suitable manner a drawing member 14 for towing the automobile, all deformations of said portions 13 being prevented by the strut 1, 2 engaging said portions 13 while the car is towed or is towing.

Figure 4:
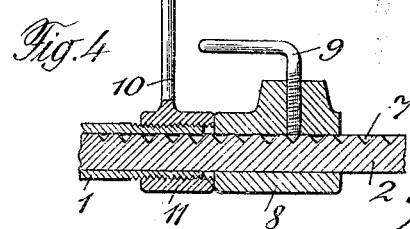
Fig. 4 illustrates a modification of a detail of this first construction.

As illustrated in Fig. 4, the ring 12 may be formed integral with the adjustable ring 8.

Referring to Figs. 5-8, 1 and 2 denote again the two telescopic portions of the strut each of which is provided on its outer end with a ledge 3 and 4 respectively. 8 denotes the adjustable ring which is for effecting in conjunction with the notches 7 the primary adjustment and 11 denotes the nut for the final or exact adjustment of the ledges 3, 4. 5, 6 is the belt for securing the strut to the automobile upon the insertion of said strut between the parts of the automobile, the deformation of which has to be prevented.

Each member 1, 2 of the strut is provided with a horn 15 arranged near the ledges 3 and 4 respectively and having a point extending outward, i. e. toward the ledge of that member on which said horn is provided.

The rope 14 which is for connecting the automobile to be towed to that which is towing, is, in contradistinction to the usual practice, not passed around parts of the automobiles, for instance the spring carrying arms or even the springs (as it is the case when springs forming more than a semiellipse are used), but around the horns 15 in the manner illustrated in Figs. 6 and 8.

In Figs. 5 and 6 the device is shown applied to the towing automobile. It is assumed, that the underframe of this automobile is supported on the back axle by means of three quarter elliptical springs. The ledges 3, 4 engage from the inner side of the arc formed by the upper portions 17 of the springs said portions 17. Shoulders 3' and 4' provided on the ledges 3 and 4 respectively, prevent a rotation of the members 1 and 2 of the strut about the longitudinal axis of the latter, while projections 18, also provided on the ledges 3, 4, secure the belt 5, 6 in its proper position relatively to the strut members 1 and 2.

In Figs. 7 and 8 the device is shown applied to an automobile which has to be towed. The strut provided with the ledges 3, 4 engages the inner side of the portions 13 of the underframe to which are fixed the spring carrying arms.

Owing to the provision of the horns 15, the drawing rope has not to be put around parts of the automobile proper and at the same time any damaging of the rope is prevented. In consequence of the fact, that the angle-shaped ledges of the strut rest against the inner side of the parts of the automobile to which the device is applied, the tensile stresses have not to be taken up by the belt 5, 6.

At the places, where the parts of the belt 5, 6 rest against the parts 13 of the underframe, pieces 16 acting as washers are placed beneath the belt 5, 6. Said pieces 16 consist preferably of leather and they are for preventing a scouring of the belt 5, 6.

In order to secure the strut in its proper position relatively to the parts 13 of the automobile to be towed, chains 20 engaging the horns 15 may connect said strut to the front axle of said automobile. (Fig. 9).

What I claim now as my invention is:

1. A towing device for vehicles, comprising a rigid structure, ledges provided on said structure and means on said structure adapted to effect a primary as well as a final exact adjustment of said ledges, adapted to engage parts of a towing or towed vehicle for the purpose of preventing a deformation of said parts of the vehicle.

2. A towing device for vehicles, comprising a rigid structure consisting of two telescopic members, ledges secured to the outer ends of said members and adapted to engage the supporting springs or the spring carrying arms of a vehicle, means on said members for effecting a primary and a final exact adjustment of the ledges fixed to said members and means for detachably securing said structure to the vehicle when said structure has been brought into the proper position relatively to the vehicle.

3. A towing device for vehicles, comprising a strut consisting of a tube and a rod, the latter being adapted to telescope into the tube and having a plurality of notches, a ledge fixed to the outer end of the tube, a second ledge fixed to the outer end of the rod, an adjustable ring mounted on said rod, an adjustable member carried by said ring and adapted to engage with a notch of the bar, an adjustable nut engaging with an external screw thread provided on the inner end of said tube and a belt consisting of two halves, each half being fixed to one of said ledges, said belt being for detachably securing the strut to the vehicle when it has been brought into the proper position relatively to the vehicle.

4. A towing device for vehicles, comprising a rigid structure, ledges provided on said structure and adapted to engage with parts of a vehicle, means provided on said structure for effecting a primary and a final exact adjustment of said ledges, means for detachably securing said structure to a vehicle, and means provided on said structure for securing a drawing member for towing the vehicle.

5. A towing device for vehicles, comprising a rigid structure consisting of two telescopic members, ledges secured to the outer ends of said members and adapted to engage with the supporting springs or the spring carrying arms of a vehicle, means on one of said members for effecting a primary adjustment, means on the other member coöperating with the aforesaid means for effecting a final exact adjustment of the ledges, a horn provided on each structure member near its outer end and means for detachably securing said structure to the vehicle when it has been brought into the proper position relatively to the vehicle.

6. The combination with a towing and a towed car, of a towing device comprising a strut consisting of two telescopic members, ledges fixed to the outer ends of said members and adapted to engage parts of the underframe of one of said vehicles, means provided on said strut for effecting a primary and a final exact adjustment of its members, a horn on each member of the strut for securing a rope thereto and a belt consisting of two halves each of which is secured to one of said ledges and adapted to detachably connect the strut to said parts of the underframe, the ledges preventing together with the rigid strut any deformation of the vehicle parts with which they are in engagement.

7. A towing device for vehicles, comprising an extensible strut having frame engaging members thereon, a primary adjusting device on the strut, and an auxiliary adjusting device coöperating with the primary adjusting device for regulating the extension of the strut.

In testimony that I claim the foregoing as my invention, I have signed my name.

WERNER HUBER.

Copies of this patent may be obtained for five cents each, by addressing the "Commissioner of Patents, Washington, D. C."